United States Patent [19]

Davis et al.

[11] Patent Number: 4,488,311
[45] Date of Patent: Dec. 11, 1984

[54] OPTICALLY PUMPED IODINE MONOFLUORIDE LASER

[75] Inventors: Steven J. Davis, Albuquerque; Leonard Hanko, Rio Rancho, both of N. Mex.

[73] Assignee: The United States of America as represented by the Secretary of the Air Force, Washington, D.C.

[21] Appl. No.: 324,346

[22] Filed: Nov. 23, 1981

[51] Int. Cl.³ .............................................. H01S 3/095
[52] U.S. Cl. ........................................ 372/89; 372/55; 372/77
[58] Field of Search ........................ 372/89, 70, 55, 58, 372/77, 56, 5

[56] References Cited

U.S. PATENT DOCUMENTS

| | | | |
|---|---|---|---|
| 3,882,414 | 5/1975 | Jeffers et al. | 331/94.5 G |
| 3,928,821 | 12/1975 | Gregg et al. | 331/94.5 G |
| 3,959,741 | 5/1976 | Meinzer | 331/94.5 G |
| 4,068,196 | 1/1978 | Hohla et al. | 331/94.5 G |
| 4,177,435 | 12/1979 | Brown | 331/94.5 G |

OTHER PUBLICATIONS

"Dye Laser Pumped Atomic Iodine Laser", Davis, Appl. Phys. Lett., 32, (10), May 15, 1978.
Clyne et al., "Kinetics of Excited $B^3\pi(0^+)$ States of BRF, ICL and IF", J. Chem. Soc., Farady Trans. II, (GB), vol. 73, p. 1094, 1977.
99Clyne et al., "Radiative and Predissociative Lifetimes of IF $B+^3\pi(0^+)$", J. Chem. Soc., Farady Trans. II, (GB), vol. 74, p. 1644, 1978.
Davis et al., "Iodine Monofluoride 140 kw Laser: Small Signal Gain and Operating Parameters", Opt. Lett., vol. 6, No. 2, Feb. 1981.
Optically Pumped Iodine Monofluoride Laser, Davis and Hanko, App. Phys. Lett., 37, (8), 692, (1980).

Primary Examiner—William L. Sikes
Assistant Examiner—Léon Scott, Jr.
Attorney, Agent, or Firm—Donald J. Singer; William J. O'Brien

[57] ABSTRACT

This invention comprises an optically pumped iodine monofluoride laser operating on the $B^3\pi(0^+) \rightarrow X^2\Sigma^+$ system. Ground state IF was produced by the reaction between $I_2$ and $F_2$ in an optical cavity which was subsequently optically pumped with a high energy, broadband dye laser to produce lasing energy.

4 Claims, 3 Drawing Figures

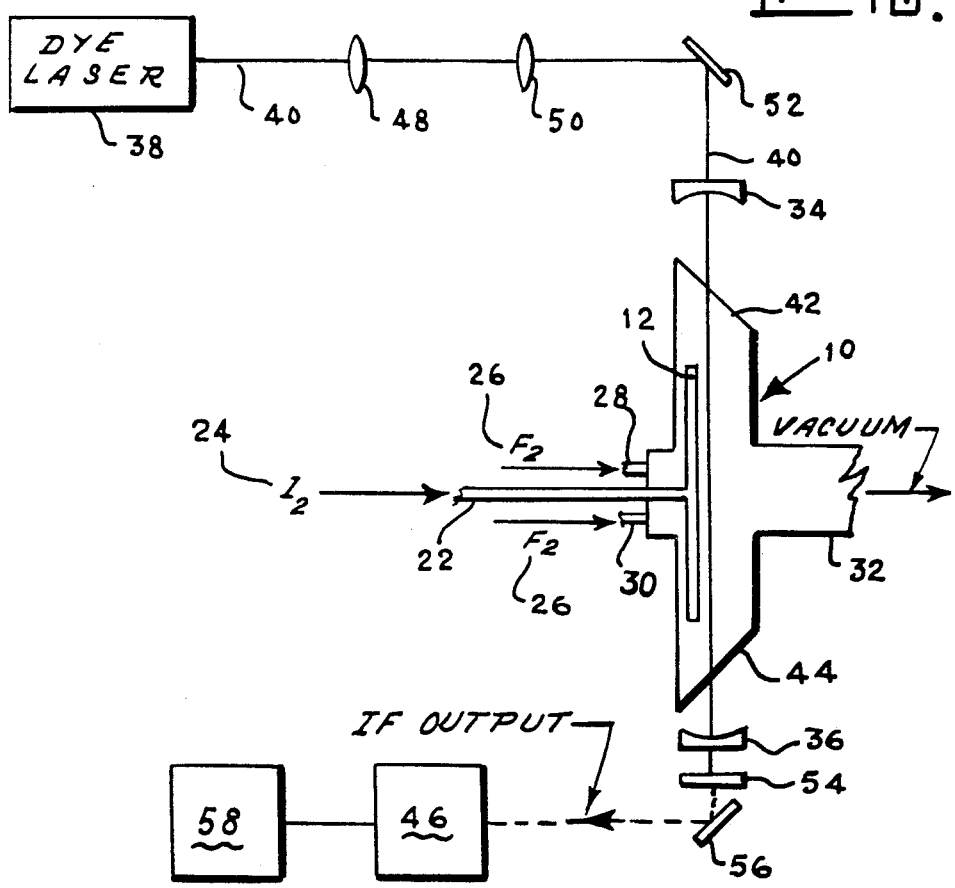

OPTICALLY PUMPED IODINE MONOFLUORIDE LASER

STATEMENT OF GOVERNMENT INTEREST

The invention described herein may be manufactured and used by or for the Government for governmental purposes without the payment of any royalty thereon

BACKGROUND OF THE INVENTION

This invention relates to chemical lasers of the visible type. More particularly, this invention concerns itself with an optically pumped, chemical gas lasing system which utilizes iodine monofluoride (IF) as a lasing medium The recent development of devices and systems for generating and amplifying coherent electromagnetic energy in the optical frequency range, generally referred to as lasing action, has generated a great deal of interest in using these systems in a wide variety of industrial and military applications. A number of systems have evolved which are capable of generating a lasing action. These systems employ an optically active component, often referred to as a lasing or gain medium, from which the coherent electromagnetic energy is extracted by means of a phenomenon called population inversion. The optically active component possesses an unstable energy state capable of releasing photons as it decays to a lower energy state. The active component may be a liquid, solid or gas and the requisite population inversion can be accomplished by the direct generation or pumping of higher energy states through the mechanism of a chemical reaction, electron beam excitation, electron discharge excitation gas dynamics or optical radiation.

Flowing gas lasers, the subject matter which concerns this invention, generally achieve the pumping or generation of the lasing action through a chemical reaction between an energizing reactant, such as vibrationally excited nitrogen, and a lasing reactant, such as carbon dioxide. Other gaseous products such as nitrous oxide, helium, hydrogen, fluorine and mixtures thereof are known for their lasing action. These gas systems are generally preferred for high energy laser devices. In recent times however, a special interest has developed in systems for producing short wavelength chemical lasers for military applications since they would have distinct advantages over gas systems such as the HF/DF lasing devices. As a consequence, a considerable research effort has evolved in an attempt to provide a solution to the problem of providing a simple, efficient and dependable short wavelength frequency laser. Among the more interesting compounds or class of molecules considered during the research effort referred to above are the diatomic halogen compounds. There is a large amount of kinetic data available about these interhalogens which would indicate that some of them might make excellent candidates for electronic transition chemical laser systems of the visible type. As a result of the above research effort, it was found that a lasing action could be produced by optically pumping a lasing medium composed of iodine monofluoride. The ground state iodine monofluoride was produced by reacting iodine and fluorine which formed a flaming reaction product of iodine monofluoride. The iodine monofluoride was then optically pumped to the necessary energy levels by a pulsed dye laser. Several different laser lines from bright red (6634Å) to near infrared (7208Å) were produced.

SUMMARY OF THE INVENTION

In accordance with the present invention, there is provided a short wavelength chemical laser device which utilizes iodine monofluoride as a lasing medium. The device is an optically pumped iodine monofluoride laser operating on the $B^3\pi(0+) \rightarrow X^1\Sigma^+$ system in which the ground state iodine monofluoride is produced by reacting iodine and fluorine to form a flame within which the monofluoride is produced. The monofluoride is then pumped or excited with a high energy, broadband dye laser. Lasing was observed on the (2, 10), (3, 11), (4, 9), and (4, 10) transitions covering the wavelength range from 7200 to 6500Å.

The device of this invention has particular utility as a gain probe for chemically generated IF lasers and as a useful prototype to study lasing in reactive flows. It can be used to obtain output spectra and powers, as well as study reactant densities and the effects of mixing on visible lasing. Such data is invaluable in designing and constructing visible lasers.

Accordingly the primary object of this invention is to provide a simple, efficient and dependable short wavelength gas laser.

Another object of this invention is to provide an optically pumped gas laser in which the lasing medium is chemically produced in the optical resonator of the laser immediately before lasing commences.

Still another object of this invention is to provide a gas laser in which visible lasing occurs within the flame resulting from the chemical reaction utilized to produce the lasing medium.

The above and still other objects and advantages of the present invention will become more readily apparent upon consideration of the following detailed disclosure thereof when taken in conjunction with the accompanying drawings.

DESCRIPTION OF THE DRAWING

In the drawing:

FIG. 2 is a schematic illustration of the laser system of this invention; and

FIG. 3 is a schematic illustration, in greater detail, of the iodine injector used in the system illustrated in FIG. 2.

DESCRIPTION OF THE PREFERRED EMBODIMENT

Figure 1:
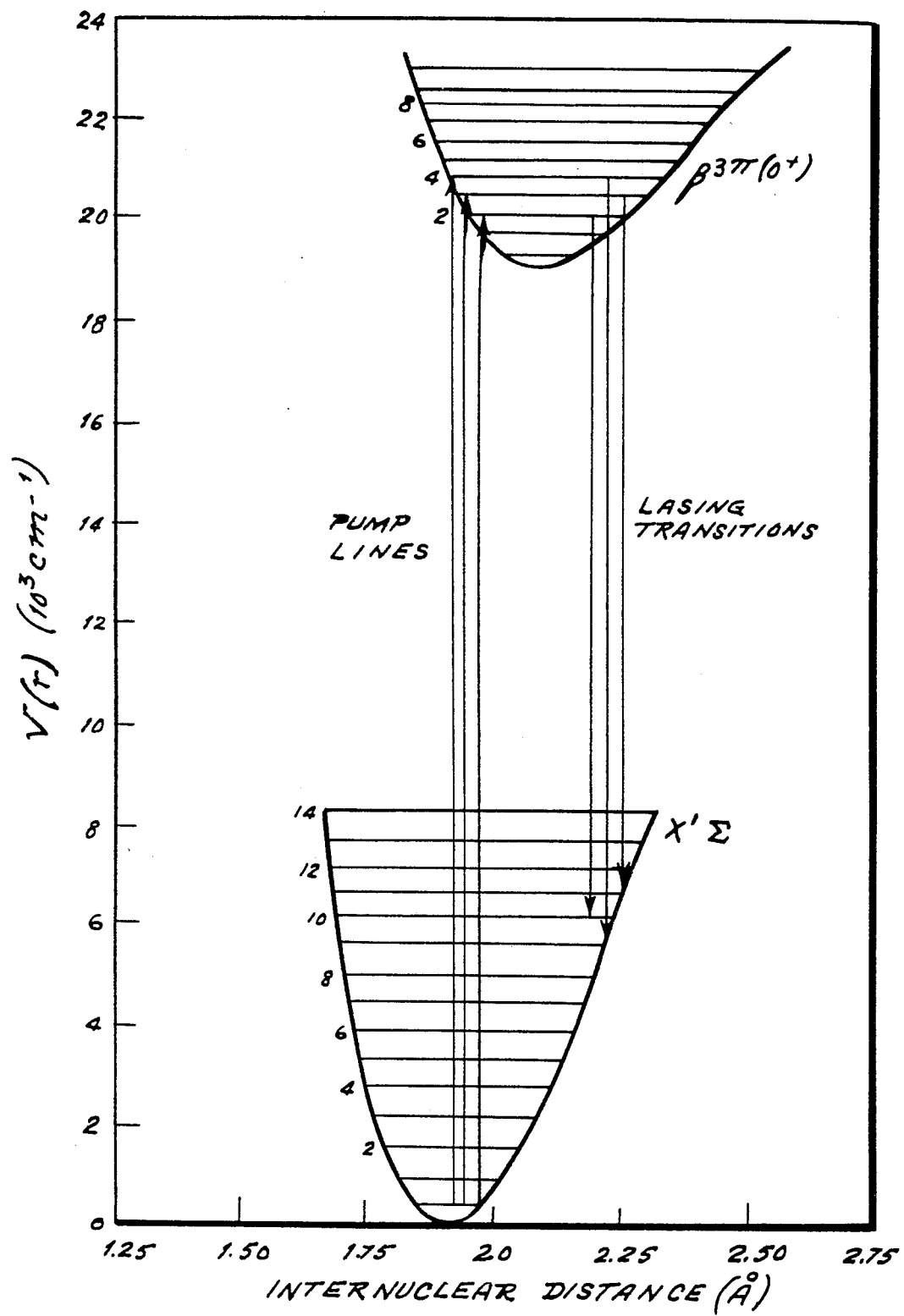
FIG. 1 is a graph illustrating the potential energy curves of $B^3\pi(0+)$ and $X^1\Sigma^{30}$ states of IF. Pumping and lasing transitions of IF are indicated.

Pursuant to the above defined objects, the present invention concerns itself with a short wavelength, optically pumped, iodine monofluoride chemical laser. The use of iodine monofluoride as a lasing medium was conceived during a concentrated research effort designed to develop short wavelength chemical lasers for military and testing applications. In carrying out the aforementioned research effort, considerable interest was shown in examining diatomic interhalogen molecules as potential lasing species since this class of molecules seems to provide attractive candidate for a short wavelength laser. There is a large amount of kinetic data available about the interhalogens which supports the hypothesis that they could be used to make visible chemical lasers.

An example of this data is shown in the detailed laser induced fluorescence lifetime studies of Clyne and McDermid, the results of which indicate that the radiative dynamics of the $B^3\pi(0+)$ states of IF make them promising candidates for laser action. M. A. A. Clyne and I. S. McDermid, J. Chem. Soc. Faraday Trans II, 73, 1094 (1977) and 74, 1644 (1978) The rotationally resolved work of Clyne and McDermid has also shown that, although the $B^3\pi(0+)$ state in the IF molecules is predissociated by an avoided crossing with another state of 0+ symmetry, several vibrational levels exist below the predissociation limit which are indeed completely stable with respect to predissociation. Finally, several chemical pumping schemes which produce the excited states of IF are known as shown by M. J. Coggoila, J. J. Valentini, and Y. T. Lee, Int. J. Chem. Kin. 8,605, (1976), and others are currently being investigated.

As a result of the continuing research effort and interest in the interhalogens as laser candidates, it was found that the iodine monofluoride species could be lased using optical pumping as the excitation source. Consequently, an optically pumped iodine monofluoride laser operating on the $B^3\pi(0+) \to X^1\Sigma+$ system was developed and forms the basis for this invention.

Recently, M. Diegelmann, K. Hohla, and K. L. Kompa, Opt. Commun. 29 334 (1979) and M. Diegelman, H. P. Grieneisen, K. Hohla, K. L. Kompa, and J. Krasinsiki, Laser Focus, 16, 52 (1980), have reported lasing in ClF and IF using electrical excitation. However, these lasers operate on higher lying transistions which terminate in the $A^3\pi(0+)$ state.

The potential curves for the $B^3\pi(0+)$ and $X^1\Sigma+$ states of IF are shown in FIG. 1. The most striking characteristic of these curves is the rather large shift in the equilibrium internuclear separation of the B state with respect to that of the X state. This is characteristic of all the halogens and interhalogen diatomics. Consequently, the most probable optical transitions from low v' terminate on high v" which are essentially empty at thermal temperatures (300 K). This feature is one of the most important for any chemical laser application.

The ground state IF molecules used as the lasing species for this invention were produced chemically in a flowtube reactor positioned within an optical resonator and subsequently pumped with a pulsed, broadband, high energy dye laser. The IF molecule is not chemically stable as it rapidly forms $IF_5$ when in contact with the walls of its container. Consequently, IF must be produced in a reactive flow.

Now with reference to FIG. 2 of the drawing, there is shown a schematic illustration of the chemical laser suitable for use with this invention. It consists of an optical resonator 10 enclosing a rake burner assembly 12 positioned within a flow tube reactor 32. The rake burner 12, 30 cm. in length, is further illustrated in FIG. 3 and consists of a one cm. diameter stainless steel tube 14 which has one mm. holes 16 positioned along its length at intervals of ½ cm. The ends 18 and 20 of the tube 14 are sealed. A conduit 22 is positioned in the center of the tube 14 halfway between the ends 18 and 20 to permit the introduction of an iodine gaseous reactant 24 into the rake burner assembly 12 for subsequent mixing and reacting with the fluorine gaseous reactant 26. The fluorine 26 is introduced through conduits 28 and 30 into the 10 cm. diameter stainless steel flow tube 32, shown in FIG. 1, where it flows over the rake burner 12 and mixes with the iodine gas 24. The iodine nozzle 22 is situated in the flowing streams of fluorine 26 such that a reactant flow of iodine monofluoride is produced of up to 30 cm. in length. The IF molecules are produced by mixing the $I_2$ and $F_2$ in the flow tube reactor 32. The iodine is injected through the center of the rake burner 12 halfway from each end and exit out through holes 16. The $F_2$ is mixed with the $I_2$ by flowing two streams of the $F_2$ over the rake burner 12. The entire mixing reactor is contained inside the 10 cm diameter stainless steel flowtube 32. The flowtube is evacuated by a 150 c.f.m. vacuum pump, not shown, and the $F_2$ and $I_2$ are both introduced as vapors through the separate delivery systems 24, 26 and 28. The $I_2$ vapor is carried in He gas while the $F_2$ is admitted to the flowtube without dilution. Typical total pressure in the chamber was 2.0 Torr consisting of 1.5 Torr He, 0.5 Torr $F_2$ and 0.03 Torr $I_2$.

Brewster window 42 and 44 are attached on each side of the flowtube 32 opposite the ends 18 and 20 of the rake nozzle 12. The Brewster windows are enclosed by the optical resonator 10 which is defined by two dichroic morrors 34 and 36 which are greater than 99.9% reflecting in the wavelength range 6400–7500Å. These mirrors also transmit greater than 80% of the dye laser pump beam 40 (4700–5050Å). The pump beam 40 was generated by a Phase R, Model 1100, dye laser 38 and passed through lens 48 and 50 before reflecting off a high power reflecting mirror 52 and then through the dichroic mirror 34 and into the lasing cavity of the resonator 10 to provide the necessary pumping energy to effect lasing of the iodine monofluoride medium.

The ground state IF was produced by reacting the molecular iodine and fluorine in the flow reactor 32. The IF, which was produced, was subsequently optically pumped to specific energy levels with the tunable pulsed dye laser 38. The optically excited IF molecules lased in the optical resonator defined by the mirrors 34 and 36 which enclosed the flow reactor 32 and the lasing energy passed through mirror 36, filter 54 and then reflected toward the detector 46 by means of reflecting mirror 56. Several different laser lines were observed ranging from bright red (6643Å) to near infrared (7208Å). The output wavelength of the IF laser could be tuned by varying the dye laser wavelength. The dye laser pulses were 0.5 sec in duration and approximately 5Å wide. The dye laser produced up to 200 mj/pulse. The output of the IF laser was detected using a P-A-R Optical Multichannel Analyzer (OMA) 46 and a strip chart recorder 58. The OMA allowed spectral assignments of the IF laser lines to be made. Lasing was observed on the following (V', V") transitions (2, 10) (3, 11), (4, 10), and (4, 9) which correspohd respectively to wavelengths 7141, 7208, 6773, and 6534Å.

The reaction of $I_2 - F_2$, which produces the $B^3\pi(0+) \to X^1\Sigma+$ states of IF chemiluminescence has been known for years, as disclosed in M. J. Coggoila et al, Int. J. Chem. Kin. 8, 605 (1976). This particular source was chosen because of its experimental simplicity. Enchanced IF $X^1\Sigma+$ production can be obtained by microwave discharging the $F_2$ if desired, but it was found that this technique was not necessary to the invention.

A pump source 38, used for optically pumping the lasing medium of this invention, was a high energy Phase R model 1100 coaxial flashlamp pumped dye laser, capable of producing 200 mj in a 0.5 sec pulse at a rep. rate of 0.2 Hz and a bandwidth of 5Å (FWHM). The IF optical resonator 10, consist of a pair of 5-meter radius mirrors 34 and 36 separated by one meter. Two sets of mirrors covering the wavelength range 6000–7500Å were used. All mirrors had reflectivity 99.9% in their particular wavelength range. The mirrors designated 34 and 36 defined the optical resonator 10 as shown in FIG. 2. The pump laser beam 40 was focused only to a diameter of 3 mm. Consequently, the pump beam was not well matched to the lower order modes of the optical cavity.

Broadband IF laser output was detected using an RCA 31034 PMT. Spectral dispersion and analysis of the laser lines was accomplished with a PARC Model 1205 Optical Multichannel Analyzer 46 which had a McPherson model 218 Monochrometer as a dispersing element.

Optical alignment of the cavity was a two-step process. Initial alignment was performed with a HeNe laser. $I_2$ vapor was then injected into the reactor and pumped to visible laser oscillation with the dye laser. The cavity was then fine tuned. Finally, $F_2$ was admitted to the reactor and IF was produced. Using $I_2$ as a test case proved to be extremely valuable since the $I_2$ laser was extremely sensitive to conditions in the flow-tube, e.g. pressure of He and window purge flow.

If lasing resulted for pumping the (2,0), (3,0), and (4,0) transitions at 5062, 4963, and 4860Å respectively as indicated in FIG. 1. Because the pump bandwidth was 5Å many rovibronic transitions were overlapped. Consequently, rotational assignments of pumped levels were impossible. However, the dye laser was tuned near the bandheads so the rotational levels pumped probably had $J=30$. (The Boltzmann maximum at 300° K is $J''=21$.) Lasing was observed from vibrational levels directly excited by the dye laser. The relatively small OMA dispersion precluded accurate rotational assignments of the IF laser lines. However, the vibrational transitions were identifiable. The lasing transitions which were observed were the (2, 10), (3, 11), (4, 9), and (4, 10) bands, which occurred at 7141, 7215, 6537, and 6762Å, respectively. The wavelengths of these transitions, combined with the pump wavelengths were compared to line positions calculated from Clyne and McDermid's constants. This procedure led to the conclusion that pumping and lasing occurred on $J'=20$. This is consistent with the pump transitions being near the bandheads if little or no rotational relaxation occurred before lasing began.

For one set of runs, however, the dye laser was tuned at least 10° to the long wavelength side of the (2,0), (3,0), and (4,0) bandheads. This corresponds to pumping rotational levels greater than $J'=30$. Lasing was still observed even for these high J lines. In all cases, no lasing was observed originating on any thermally relaxed vibrational levels, and the extent of rotational relaxation, if any, that occured prior to lasing is unknown at present.

The broadband pump threshhold was approximately 70 mj incident upon the chamber. However, this could probably be reduced by at least an order of magnitude by employing a narrowband dye laser. Also, it was impossible to focus the pump beam to less than 3 mm diameter over the length of the IF chamber. Consequently, since the dye laser was not well matched to the mode volume of the IF cavity, the pumping photons were not efficiently utilized.

The IF laser pulse followed the time history of the dye laser pulse, indicating that no bottlenecking on the high v" levels was occurring. The IF laser was observed to be sensitive to the stoichiometry of the IF production chemistry. The most stable lasing was observed at a total pressure of 2 torr, consisting of the reactant ratios: $He/F_2/I_2=1.5/0.47/0.03$. The addition of the He such that the total pressure exceeded 7.5 torr precluded lasing. Changes in the $F_2$ partial measure below or above the 0.47 torr were deleterious to the laser output.

Although the pump pulse was about 5Å wide, more than 100 mj was incident upon the IF chamber. Therefore, the fractional energy available to any one rovibronic transition is the ratio of the doppler width of an IF absorption line to the actual pump laser bandwidth, which is centered on the absorption line. This ratio, $1.1 \times 10^{-3}$, implies that approximately 0.11 mj is available to pump a single rotational line. This represents a peak pump power of about 250 Watts. In examining pumping on the $v''=0, J''=21-v'=3, J'=22$ line, it can be assumed that all the $I_2$ in the chamber is converted to IF; i.e. 0.03 Torr. This yields an IF equilibrium number density of about $2.7 \times 10^{-13}$ cm$^{-3}$ in the 0,21 level at 300K. The high pump intensity should be sufficient to saturate the 3,0 band $(J=21)$ for this number density. This implies the number density of the $v'=3, J'=22$ level will be $N_{v',J'}=1.3 \times 10^{13}/cm^{-3}$ at saturation.

The IF optically pumped laser is extremely interesting for several reasons. The lasing medium was not contained in a sealed cell, but was produced by a chemical reaction within the optical resonator. Previously all known optically pumped diatomic lasers have been performed in sealed quiescent cells. The fact that the lasing took place in a flame is important from the point of view that the optical homogeneity of the flow was uniform enough to support short wavelength (visible) lasing oscillation. Also, it is the first known visible lasing in such a flame and the first known visible lasing in a reacting flow. This medium homogeniety question has been a serious concern in attempting a develop visible chemical laser. Furthermore, this is the first known visible lasing on any interhalogen molecule. The laser of this invention demonstrates that the IF molecule in particular and the interhalogen molecules, such as BrF and BrCl, in general are excellent short wavelength chemical laser candidates. It shows clearly for the first time that the kinetic processes of the excited stats of IF are stable enough to support lasing oscillation.

While the invention has been described with particularity in reference to a specific embodiment thereof, it is to be understood that the disclosure of this invention is for the purpose of illustration only and is not intended to limit the invention in any way the scope of which is defined by the appended claims.

What is claimed is:

1. An optically pumped laser system which comprises:
    (A) a resonant cavity bounded by a substantially totally reflective mirror and a partially transmissive mirror;
    (B) nozzle means for directing a first molecular iodine gaseous reactant and a second molecular fluorine gaseous reactant into said resonant cavity to produce an iodine monofluoride lasing medium in the form of a non-stable, chemiluminescent, reaction product; and
    (C) a source of optical pumping energy positioned to direct an energy beam of electromagnetic energy at said lasing medium to effect its population inverson and thereby produce laser energy.

2. A laser system in accordance with claim 1 wherein said pumping source comprise a tunable pulsed dye laser.

3. A laser system in accordance with claim 1 wherein said nozzle directing means comprises a centrally located nozzle for delivering said first gaseous reactant in a predetermined direction and further includes a pair of conduits each disposed on an opposite side of said centrally located nozzle for delivering said second gaseous reactant in the same predetermined direction.

4. A method for producing an optically pumped beam of coherent electromagnetic radiation which comprises the steps of:

(A) providing a resonant cavity;
(B) introducing a flow of a first molecluar iodine gaseous reactant and a second molecular fluorine gaseous reactant into said resonant cavity.
(C) mixing said first and second gaseous reactants to effect a chemical reaction therebetween and produce a nonstable, chemiluminescent, iodine monofluorine, reaction product; and
(D) directing a source of optical pumping radiation as an excitation source at said chemiluminescent, iodine monofluoride, reaction product to effect its population inversion thereby producing said beam of coherent electromagnetic radiation.

* * * * *